United States Patent [19]

Eckels

[11] 4,282,450

[45] Aug. 4, 1981

[54] DYNAMOELECTRIC MACHINE WITH CRYOSTABLE FIELD WINDING

[75] Inventor: Phillip W. Eckels, Penn Hills, Pa.

[73] Assignee: Westinghouse Electric Corp., Pittsburgh, Pa.

[21] Appl. No.: 78,751

[22] Filed: Sep. 25, 1979

[51] Int. Cl.[3] .......... H02K 9/00

[52] U.S. Cl. .......... 310/52; 310/45; 310/61; 310/215; 310/261; 336/DIG. 1

[58] Field of Search .......... 310/10, 40, 45, 52, 310/61, 43, 64, 65, 60 A, 58, 261, 214, 215, 194, 59; 335/216, 300; 174/128 S; 336/DIG. 1, 60

[56] References Cited

U.S. PATENT DOCUMENTS

| | | | |
|---|---|---|---|
| 3,514,730 | 5/1970 | Kassner | 336/DIG. 1 |
| 3,781,581 | 12/1973 | Lehuen | 310/214 |
| 3,821,568 | 6/1974 | Gillet | 310/61 |
| 3,956,724 | 5/1976 | Fagan | 335/216 |
| 3,983,427 | 9/1976 | Ulke | 310/261 |
| 4,013,908 | 3/1977 | Weghaupt | 310/61 |
| 4,037,124 | 7/1977 | Kullmann | 310/52 |
| 4,060,743 | 11/1977 | Weghaupt | 310/10 |
| 4,151,639 | 5/1979 | Weghaupt | 310/59 |
| 4,152,610 | 5/1979 | Wallenstein | 310/59 |

*Primary Examiner*—R. Skudy
*Attorney, Agent, or Firm*—G. H. Telfer

[57] ABSTRACT

Cryostability is achieved by a superconductive rotor of a dynamoelectric machine constructed in accordance with the invention. The superconductive rotor comprises: a rotor shaft; a support rim; a plurality of slot teeth formed at the outer periphery of said rim, said teeth located between and defining a plurality of rotor slots; and a plurality of slot assemblies, one within each rotor slot. Each slot assembly comprises: a plurality of stacks of superconductors, each superconductor within a stack having insulation on only two of its sides and being disposed one on top of another in generally radial direction relative to the rotor shaft; a plurality of insulative separators, one between each pair of stacks; a top insulative strip and a bottom insulative strip, respectively radially above and below said conductor stacks; and a side panel on either side of the slot assembly and next to a slot tooth. Cooling channels are disposed on the surfaces of the separators, the side panels and the top and bottom strips so as to establish at least one coolant path along which coolant may be circulated to, within and from the slot assembly by natural convection.

13 Claims, 7 Drawing Figures

DYNAMOELECTRIC MACHINE WITH CRYOSTABLE FIELD WINDING

BACKGROUND OF THE INVENTION

Field of the Invention

This invention relates generally to a superconducting dynamoelectric machine, and more specifically to a cryostable rotor winding for a superconducting generator.

SUMMARY OF THE INVENTION

This invention relates to a design for a superconducting turbo-generator which can perform with cryostability. The term "cryostability" pertains to the capability of the generator's winding to return to its superconducting mode of operation, while carrying full operating current, after experiencing a brief transition to its resistive state.

To achieve cryostability, a new design is proposed, and described herein, for the manufacture and operation of a generator. The design involves several features of a slot assembly for a superconductive generator's rotor including the cooling system, conductor configuration, and insulation arrangement. With this design the current density of the new improved superconducting rotor winding is comparable to that of present machines. Improvement in generator reliability, reduction in cost, and facility in manufacture can be realized.

In general, a brief review of a superconductive generator is in order.

It is known that when certain materials, referred to as superconductors, are cooled to near absolute zero they exhibit a complete loss of electrical resistance. Practical utilization of this zero-resistance characteristic of superconductive materials at cryogenic temperatures has recently been applied in dynamoelectric machinery. The development of the intrinsically stable multifilamentary superconductor has made it possible to build stable superconducting windings with relatively high transport current densities in large direct current fields.

The use of the superconductive direct current field winding allows a considerable increase in the field magnetomotive force generated by the windings and greatly increased flux densities in the active air gap of the machine. This increase in flux density obtains considerably increased power density and consequential reductions in the weight and volume of the machine. Also, higher ratings for turbine generators can be obtained without prohibitive increases in frame size.

It is useful to consider the phenomenon of superconductivity and the related properties of superconductors in order that the present invention may be clearly understood. Superconductivity is the state in which some metals offer no resistance to current flow and therefore do not generate heat as do normal conductors. The resistance at superconducting temperatures is not merely extremely low, it is exactly zero. Superconductivity occurs only at very low temperatures; the temperature is different for each material and is known as the transition or critical temperature, $T_C$. At the transition temperature, which is a few degrees above absolute zero, there occurs a thermodynamic transition into the superconducting state. The transition temperature, in the absence of a magnetic field, is approximately 3.7 degrees Kelvin for tin, 7.3 degrees Kelvin for lead and 8 degrees Kelvin for niobium. For further information on specific properties, see National Bureau of Standards Technical Note 724, "Properties of Selected Superconductive Materials," published by the U.S. Dept. of Commerce.

In addition to temperature, the strength and geometry of magnetic fields affect superconducting materials. A material will suddenly lose its superconductivity in a high strength magnetic field, even a self-generated field, when it reaches a value known as its critical magnetic field, $H_C$. There also exists a critical electrical current density, $J_C$, which is dependent upon both the temperature and the magnetic field. The three parameters T, H, and J define a three-dimensional surface separating the superconducting and normal (non-superconductive) regions as illustrated in FIG. 1 of the drawings. For a given temperature $T_{op}$ (shaded region of FIG. 1) a superconducting coil will have some design load line as illustrated and an operating point P' chosen to be less than the critical point P, where normal transition occurs. This return to the normal state is usually called a quench. It should be understood that while the shape of the critical curves for any superconductive material is generally as indicated in FIG. 1, the intercepts at the axes are determined by the properties of the material selected.

At present, several materials are candidates for high-field, high-current superconductor applications in turbine generator field windings. Two of these are NbTi and $Nb_3Sn$. These display an appropriate range of magnetic field, temperature, and current density over which they are superconducting. Of course, conductor fabrication, coil construction, and operating line play important parts in the choice of conductor materials.

Superconductors which are suitable for high-current density, high-field applications (usually called type II or hard conductors) are subject to instabilities, where a small disturbance in operating conditions can cause a quench, even though the critical current density, magnetic field, or temperature is not exceeded except in a very small region. The current carrying capability of a single superconductor is limited by the maximum field seen at any point on the conductor. The current rating of a superconductive winding will therefore be greatly reduced by high flux concentration, even in a small region of the winding.

Various techniques for preventing premature normalization, such as that due to non-uniform magnetic field conditions, are known in the prior art. One known technique is to form each superconductor strand from many fine filaments embedded in a high electrically and thermally conductive material such as high purity copper. The entire superconductor is usually formed of a plurality of such strands transposed to reduce eddy current losses. The copper dissipates heat from any small portion of the superconductor that may happen to normalize from heating the strand and triggering possible destruction of superconductivity throughout the coil. Such a superconductor has been described by M. N. Wilson, et al., in "Experimental and Theoretical Studies of Filamentary Superconducting Composites, Part I," "Journal of Physics D-Applied Physics," November 1970, Vol. 3, p. 1517.

The amount of the copper used in this technique is usually between one and three times the amount of superconductor. Although the use of copper increases operating stability, it has the undesirable effect of significantly reducing the overall current density, particularly when the ratio of copper to superconductor is increased to a proportion greater than 3:1. Thus, there exist practical limitations on the use of the copper dissipation technique.

From the above it can be seen that an important consideration is the problem of normalization in the superconductive winding. The design importance of this problem is mitigated, if not eliminated, by the invention since cryostability is a virtue of the superconducting generator having a rotor constructed in accordance with the invention.

According to the invention, a superconductive cylindrical rotor for a dynamoelectric machine is rotatable about an axis and has on its outer periphery a plurality of slots. Each slot extends substantially along the length of the rotor. A slot assembly is disposed within each of said slots.

The slot assembly comprises several features which shall be discussed with more detail. A plurality of slot walls extend in a generally radial direction relative to the rotor axis. A plurality of conductor columns or stacks make up the winding. Each column has a plurality of superconductors stacked one on top of another in a generally radial direction relative to the rotor axis. Each of the superconductors has a generally rectangular cross section with surfaces generally parallel to the side walls, and other surfaces generally perpendicular to said parallel surfaces, said perpendicular surfaces having insulating material thereon. In other words, each superconductor has insulation on only two of its surfaces—those surfaces which are juxtaposed to adjacent superconductors in the same stack. A plurality of insulative separators, one on each radial side of each conductor column, is also provided. Each separator has surfaces parallel to the side walls of the slot assembly on which are located a plurality of coolant channels. The slot assembly also includes means for introducing coolant into the coolant channels and means for removing the coolant from the channels.

The slot assembly may also have a top strip radially outward from the conductor columns and a bottom strip radially inward from these columns. These top and bottom strips should be made of a generally insulative material and should have a plurality of surfaces, perpendicular to the side walls, on which are located coolant channels. These cooling channels should extend generally perpendicular to said side walls; and should be in alignment, or fluid communication, with the channels in the insulative separators.

BRIEF DESCRIPTION OF THE DRAWINGS

The objects and advantages of this invention will become apparent from reading the following detailed description in connection with the accompanying drawings, in which.

DESCRIPTION OF THE PREFERRED EMBODIMENT

Figure 1:
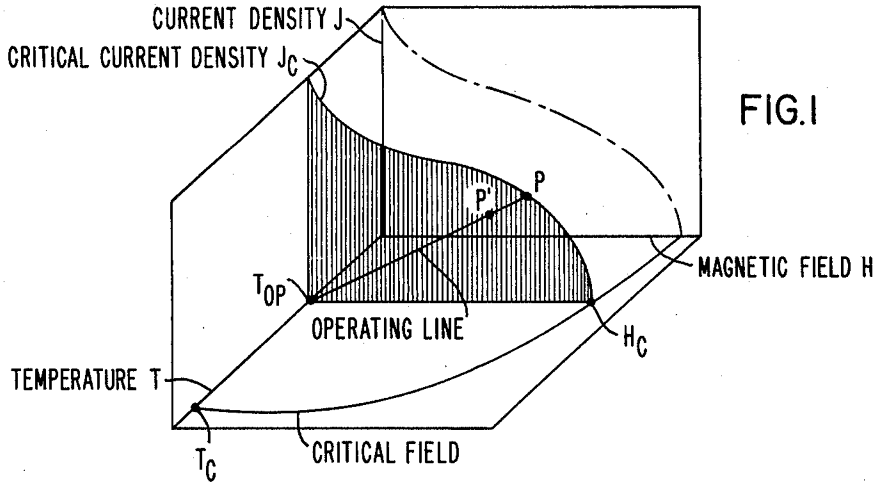
FIG. 1 is a graph showing the operating line of a superconductive generator as a function of current density, magnetic field, and temperature.

Throughout the description which follows, like reference characters refer to like elements on all figures.

Figure 2:
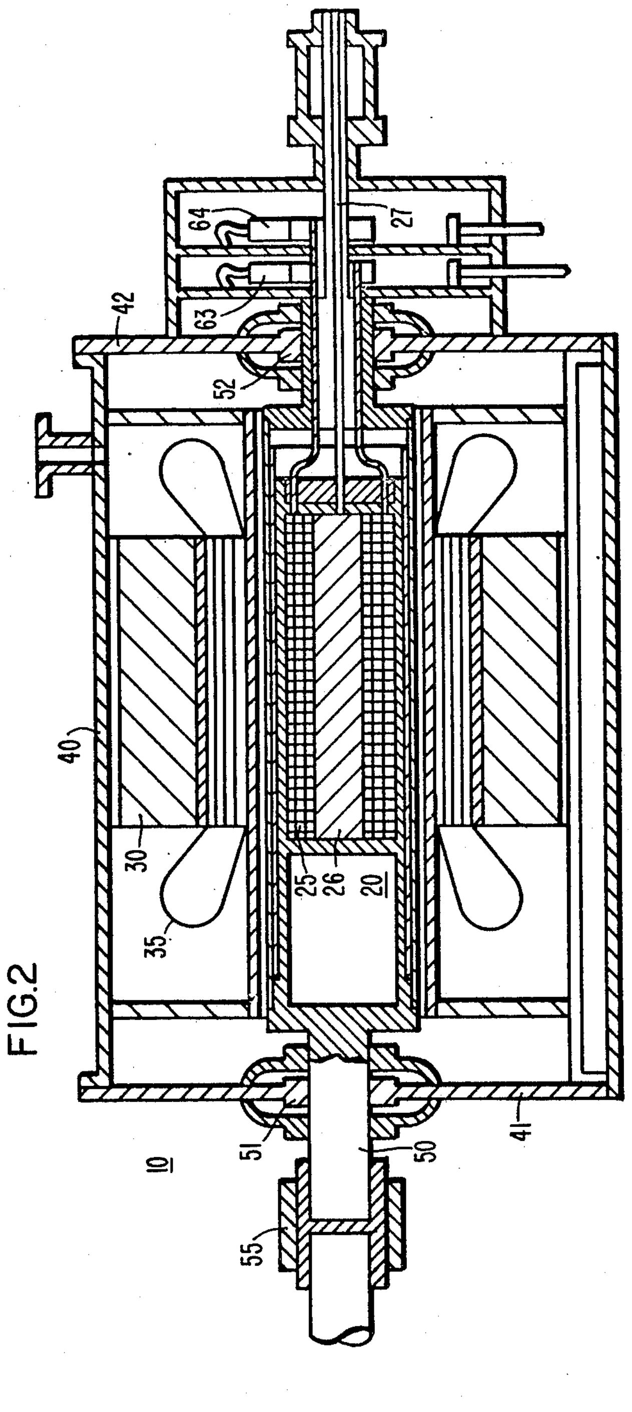
FIG. 2 is a cross-sectional view of a superconductive dynamoelectric machine.

Referring now to the drawing, FIG. 2 illustrates a synchronous generator 10 having a superconductive rotor field winding which is constructed according to the teachings of the present invention in a manner to be hereafter described.

The generator 10 comprises a rotor assembly 20 and a stator assembly 30 which are enclosed in a housing 40. The housing 40 is generally cylindrical in shape and is closed by end plates 41 and 42. A shaft 50 is mounted in the housing by bearings 51 and 52. The bearings 51 and 52 are conventional and are positioned at each end of the housing 40 to support the shaft 50 for rotational movement by a prime mover (not shown). A flexible drive coupling 55 is used to isolate prime mover end play motion from the rotor assembly 20. The rotor assembly 20 comprises a superconductive direct current field winding 25 which is, for example, wound about a non-ferromagnetic core 26. A coolant such as liquid helium is introduced into the rotor 20 through a coolant supply pipe 27. Also shown is the stator 30 which supports a non-superconductive winding 35. The stator winding 35 is adapted for multiphase alternating current output and the rotor field winding 25 is adapted for connection to a direct current source (not shown) for the excitation of the generator. The direct current electrical energy is applied to the winding 25 by means of appropriate slip ring assemblies 63, 64.

Figure 3:
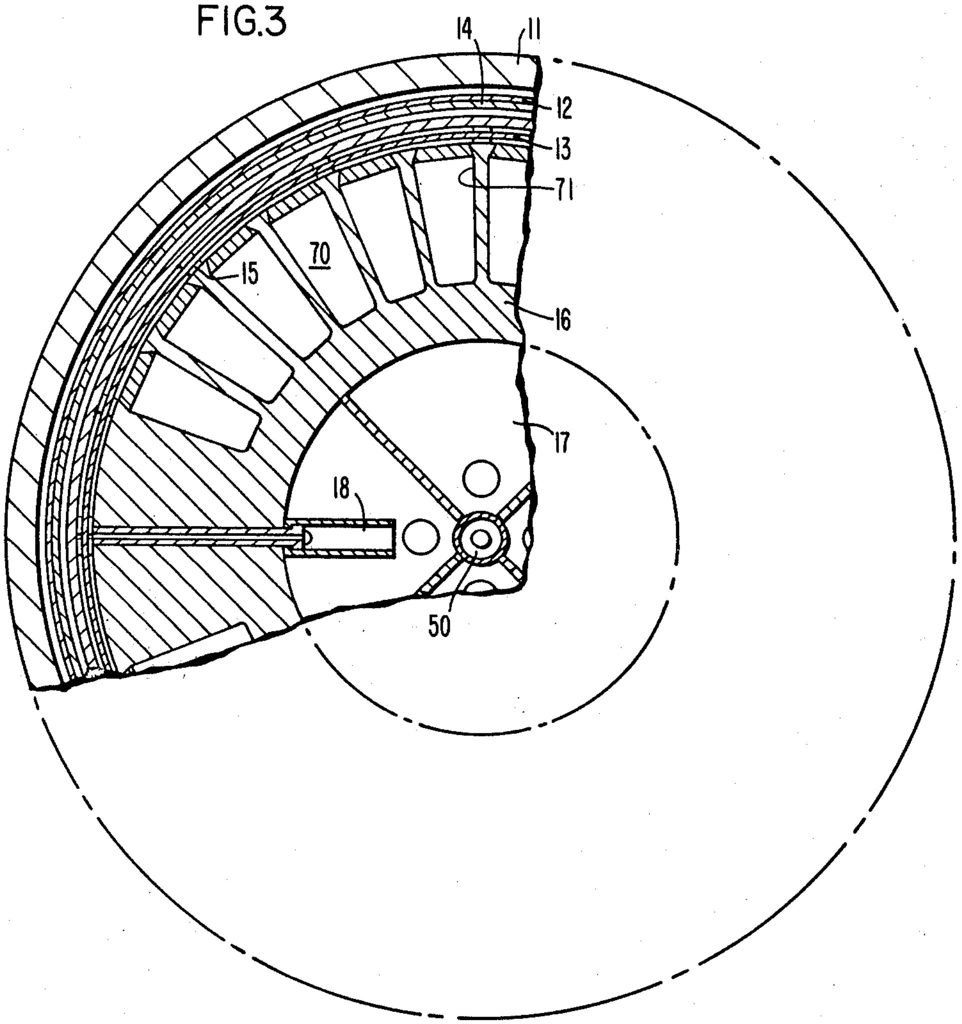
FIG. 3 is an axial cross-sectional view of a superconductive rotor.
Figure 4:
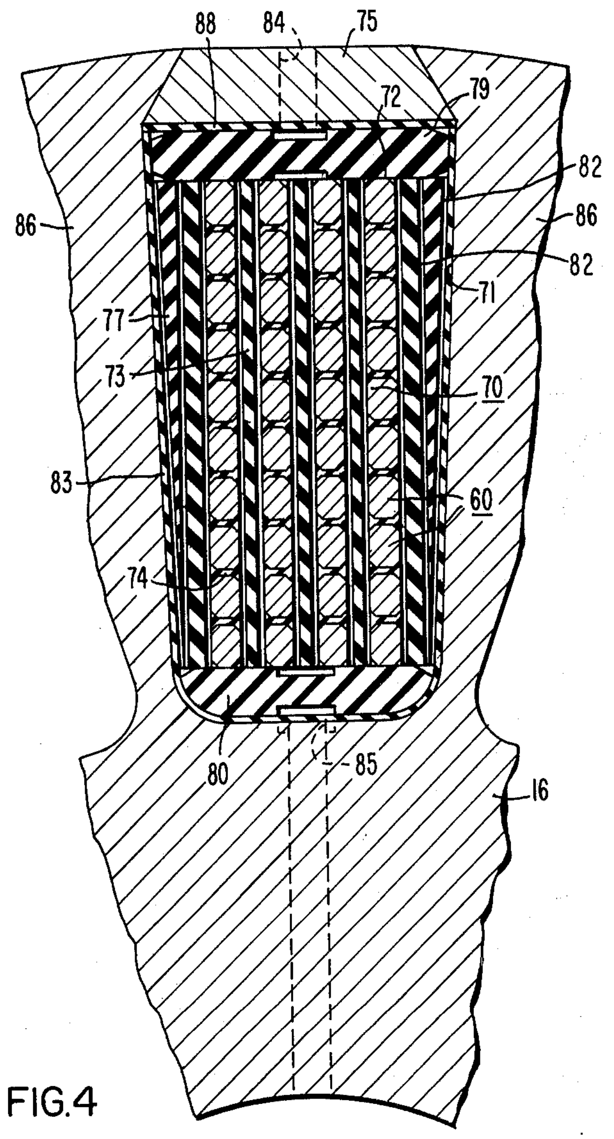
FIG. 4 is a detailed schematic of a slot assembly for a superconductive rotor.
Figure 5:
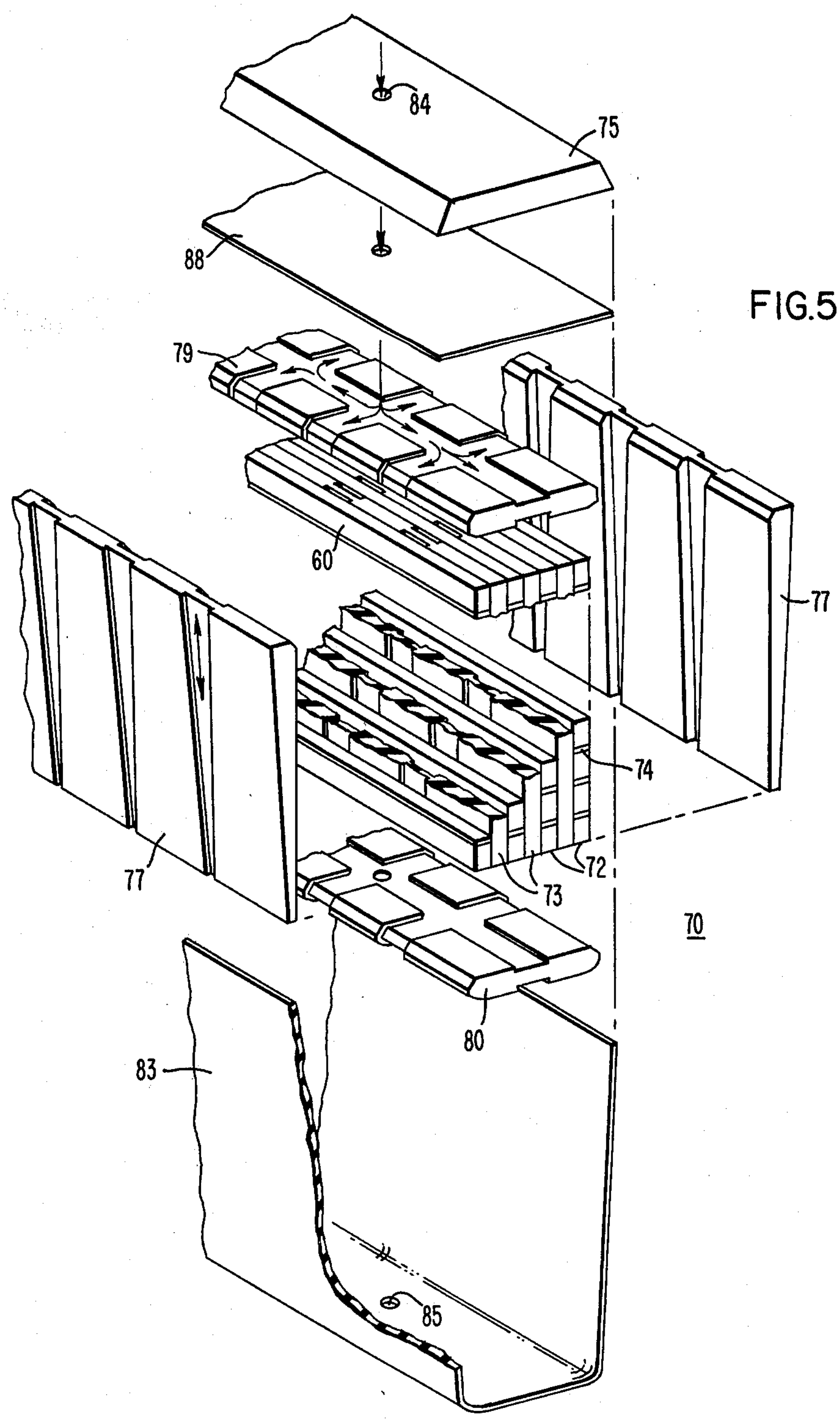
FIG. 5 is an exploded view of the rotor slot assembly of FIG. 4.

The rotor design is shown conceptually in FIGS. 3, 4 and 5.

The rotor winding 25 is comprised of composite conductors made of a superconductive material such as niobium titanium (Nb-Ti) alloy. Each composite conductor consists of a plurality of fine filaments, each filament being, for example, approximately 40 microns or less in diameter. The filaments are imbedded in a copper matrix and are twisted about the composite axis. The entire composite is covered with a thin layer of insulation.

The superconductive winding is wound about the cylindrical non-ferromagnetic core, such as a support rim, and is wedged to minimize losses due to conductor motion. Cooling is provided by passages disposed within the field winding. The cooling system, described in detail below, directs the flow of cryogenic fluid outward through the pole region peripherally around to and radially inward through the winding and radially inward to the center where it is collected.

ROTOR END VIEW

FIG. 3 is an axial cross-section of the rotor. The elements that comprise the rotor shall be described generally in order from the outermost element in FIG. 3 to the innermost element, the rotor shaft 50 at the center of the figure.

A warm damper shield 11 operable at temperatures above the superconducting critical temperature, is comprised of three layers of materials and acts to inhibit transient magnetic field penetration. A thermal radiation shield 12, just inside the warm damper shield 11, acts to inhibit radiation from the warm damper shield 11 from reaching a cold zone within the rotor. Immediately inside of this is a cold damper shield 13, operable at temperatures below the superconducting critical temperature, which acts to prevent further compression of flux in the winding. A containment wall 14 acts as a vessel wall to contain the helium. Within the containment wall 14 is a plurality of helium feed inlets 15 which act to distribute coolant to each individual slot assembly 70. The helium is introduced into the rotor via at least one distribution conduit 18, and then forms a helium pool 17 therein. The rotor slot cells, each designated by numeral 71, are defined by and contained within the support rim 16, comprised for example from a plurality of rings of core material.

SLOT ASSEMBLY

The invention can be best understood by a close examination of FIGS. 4 and 5 together with the following detailed description.

As can be seen in FIG. 3 the rotor comprises a plurality of slot assemblies, each designated by the numeral 70. The slot assemblies are circumferentially oriented about the rotor shaft. FIG. 4 is a detailed view of a single slot assembly 70. A slot cell 71 is defined by the rotor slot teeth 86 which extend in a generally radial direction from the winding support rim 16. At the top of the slot cell 71 is a slot wedge 75 which secures the rotor winding from motion in a general radial direction, such as that caused by centrifugal force.

The contents of the slot cell 71 can best be understood from FIG. 5 which is an exploded view of the slot assembly 70 of FIG. 4.

Referring to both Figures, the rotor slot assembly 70 comprises a plurality of stacks 72 of superconductors contained within the rotor slot cell 71.

The superconductors, shown in cross-section in FIGS. 4 and 5, can be considered to form an array of columns and rows. The columns are the stacks 72, mentioned above, and extend in a generally radial direction. The rows extend in the direction generally perpendicular to the columns.

As shown, the superconductors, having a generally rectangular cross-section, are oriented so as to have their wider surfaces extending in parallel to the matrix columns.

According to the invention helium enters the slot cell area through a slot coolant inlet 84 which, for example, is a bore that proceeds through the slot wedge 75. The coolant circulates through the slot assembly along a predetermined coolant path or circuit. The helium coolant exits from the slot cell area through a slot coolant outlet 85 which, for example, is a bore that extends through the support rim 16 beneath the individual slot cells 71. The coolant outlet is fluidly connected to a coolant removal system which conducts the coolant away from the slot assembly area.

According to the invention each superconductor stack 72 comprises a plurality of superconductors 60. Each of the superconductors 60 is separated from adjacent superconductors within the same stack by layer insulation 74. The individual superconductors therefore only have insulation on two of their sides. This shall be discussed more fully below.

Figure 7:
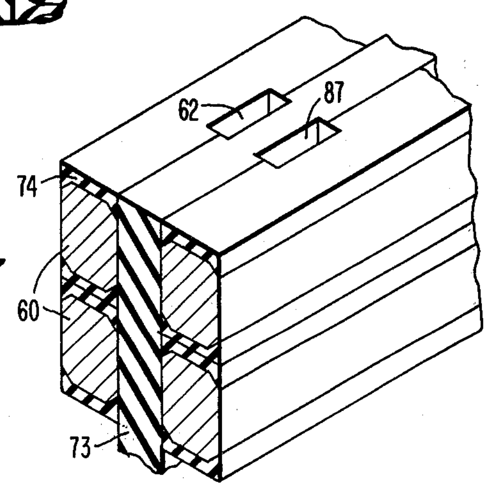
FIG. 7 is an illustration showing the geometry of the superconductors made in accordance with the invention.

Each of the superconductive stacks 72 are separated one from another in such manner as to define a stack helium channel therebetween. This is achieved through the use of an insulative separator 73 containing channels on its surfaces. This arrangement permits direct contact of the coolant with two sides of each of the superconductors 60. Each superconductor's insulated surfaces are disposed juxtaposed to coolant channels. Since heat removal depends on the surface area of the wetted surface of the superconductor, each of such surfaces may contain a plurality of channels 62 to increase its surface area. The channels 62, for example, may extend into the conductors for a distance of 15 mils and be 150 mils in length along the surface of the conductors. This is shown in FIG. 7.

Returning now to the general geometry of the slot cell 71, it can be seen from FIGS. 4 and 5 that the cell is lined with a slot insulation liner 83. The slot insulation liner 83 is of a generally "U"-shape. The bottom insulation strip 80 is generally located between the slot liner 83 and the superconductors which are radially closest to the rotor shaft 50. At the top of the rotor slot cells 71 is a top insulation strip 79, which is located between the radially farthest superconductors and a wedge driving protective strip 88 which is located radially inward from the rotor slot wedge 75. Separating each of the superconductor stacks 72 is more insulation hereinafter called the slotted separators 73. These separators 73 have channels on their surfaces, which, for example, run parallel to the conductors, and others which run radially relative to the rotor shaft. These channels are the stack helium channels described above.

The top and bottom insulation strips, 72 and 80, also have helium channels. These include channels which run generally peripherally, i.e. circumferentially relative to the rotor shaft, as well as channels which run in parallel to the superconductors 60.

On either side of the slot cells 71 and disposed proximate to the rotor slot teeth 86 is located a side insulation panel 77. The side insulation panel 77 is located between the portion of the slot liner 83 that runs along the rotor slot teeth 86, and a slotted separator 73 which is adjacent to a superconductor stack 72 which is closest to the rotor slot teeth 86. The side insulation panels contain therein helium reservoirs or channels 82 which extend radially relative to the rotor shaft.

Each of the superconductors 60 in FIGS. 4 and 5 has insulation only on two of its sides, with the other two sides bare. This enhances the thermal communication between the coolant and the conductor. Between each of the superconductors 60 within any one of the stacks 72 is a strip of insulation having contained thereon cooling channels machined or in some other way manufactured in both its top and bottom surfaces. This layer insulation 74 may be for example of an epoxy-glass composite.

For higher integrity in the layer insulation 74, it is not merely a flat strip, but rather extends for a slight distance about the uninsulated side. For example, the layer insulation may extend so as to cover in the range of one-half to all of the rounded corners of the rectangular superconductors as is shown in FIG. 7. This serves as a voltage standoff between adjacent conductors in a stack.

To maximize the cooling effect of the coolant flowing in the layer insulation's channels, a limitation is placed on their dimensions. In the range of two-thirds of the surface area of the bare conductor sides must be wetted surface. Wetted surface is the term that is used to designate the area of the conductor surface reserved for the helium channels. Since the two sides are uninsulated, the helium flows directly contiguous to the conductors on those sides for highly efficient heat removal. Overall, this combination of conductor cooling ensures structural and electrical integrity of the slot assembly 70, while at the same time improves the conductor cooling capability of the coolant system.

SUPERCONDUCTOR COOLING

Cryostability, as is embraced by this invention, is achieved by the improving and increasing of the cooling capabilities of the cooling system in the rotor. To understand this more fully, it is necessary to review the conventional cooling systems in superconductor rotors proposed in the past.

Figure 6:
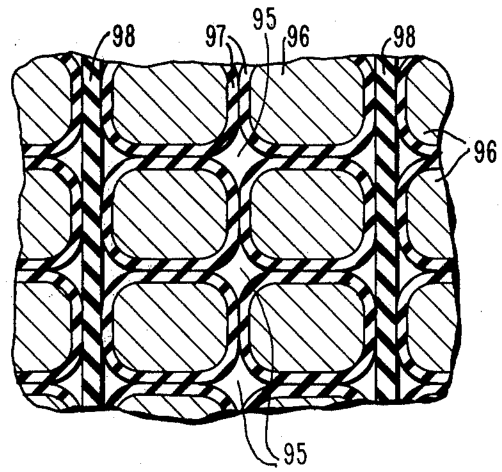
FIG. 6 is an illustration of a conductor arrangement in a conventional superconductive dynamoelectric machine typical in the prior art.

Previous superconducting generators incorporated adiabatic stability as their chief cooling technique. Referring now to FIG. 6, a stack arrangement typical in the prior art is there shown. Each of the prior art superconductors 96 is completely covered with conductor insulation 97. This insulation is present on each and every side of the superconductor. Unfortunately, in addition to acting as electrical insulation, it also acted as a thermal barrier, thereby inhibiting the cooling effect of the helium. A spacer 98 offered structural integrity to the conductor arrangement, with a predetermined number of superconductors 96 employed between each spacer 98.

The geometry of the superconductor in the prior art is crucial to the understanding of the cooling system. The superconductor was of a generally rectangular cross section oriented in the rotor slot so as to have its longer side perpendicular to the slot walls. As can be seen in FIG. 6, the superconductors also had rounded corners. In cross section, the dimensions of the prior art superconductor were, for example, 3.3 mm×2.23 mm with a radius of 0.92 mm at each corner. The insulation around each superconductor was approximately 0.08 mm thick.

As stated above, these superconductors relied on adiabatic stabilization for cooling. This means that some feature or element in the winding is capable of storing the excess unwanted heat generated within the conductors. The heat is stored within the conductor volume. The feature used in the previous designs for the adiabatic stabilization was the area reference in FIG. 6 by the numeral 95 and herein designated a helium storage area. The helium storage area 95 is circumscribed and defined by the four rounded corners of the surrounding superconductors. The greater the radius at these corners, the larger the area for helium storage. The helium storage area 95 was generally a deadend channel in that there was no means of introducing or removing coolant from each helium storage area 95. The coolant in each particular helium storage area 95 thus remained in that area and did not circulate in other parts of the slot assembly. Thus the helium in an area, remained in only that area during normal operation of the machine. To achieve adiabatic stabilization, for example, 15% of the volume of the stack had to be reserved for this stored helium. This should be compared with a generator made in accordance with the present invention, which requires 5% to 6% of the stack volume for helium. This difference is directly attributable to the increased cooling efficiency of flowing coolant by natural convection compared with that of stored coolant.

Another important distinction over the previous design is that the present invention circulates coolant by natural convection in a high acceleration field from a remote location to the winding to remove unwanted heat from the conductor volume; and therefore, from the slot assembly. For example previous designs used forced flow of coolant or coolant storage.

In adiabatic stabilization, copper was used as a matrix around the superconducting material. This copper matrix, it should be remembered, acted to stabilize the winding because it had a relatively higher resistivity and therefore minimized eddy currents in the winding. As discussed in the Background above, the amount of copper in the superconductor was maximized within the practical limits established by the current density to achieve the greatest stabilizing effect. The copper matrix that surrounds the superconducting material in previous designs to stabilize the winding during temperature transients had a resistivity ratio (resistance at 300° K. divided by resistance at 4.2° K.) of approximately 64.

The heating effects of eddy currents in the new and improved design incorporating this invention are not as harmful to the operating conditions of the generator because normalization is not as critical. Therefore, the resistivity of the copper can be lower. For example, the resistivity ratio can now approach a number as high as 150. This improvement is gained through the improved heat removal capabilities of the cooling system described herein.

OPERATING CONDITIONS

Referring once again to FIG. 1, an advantage can be gained through the utilization of this invention in the operating conditions and parameters of a superconductive generator. In the cryostable winding the superconductor can be worked to a higher fraction of its critical current. Thus, the design of the superconductor can encompass a reduced amount of the actual superconducting material. This achieves a reduced cost since typically the superconductor material is relatively more expensive than copper. Also this enables the use of more copper in the copper matrix to stabilize the conductor.

It is best at this point in the description of the invention to amplify and explain the operating parameters of the superconducting generator. The critical current density is that density at which the superconductor first shows a resistance to the flow of electricity. This depends upon the magnetic field and the operating temperature. The magnetic field, measured in Teslas, is the field to which the superconductor is exposed during operation. It includes components such as that generated by the field coil plus that of the conductor itself, that is, its self-field.

As was discussed previously, the load line is a line extending from zero in the graph in FIG. 1 up to a point, P, determined and fixed by empirical testing of specific superconductors. Previously it has been found that the operating current density, and corresponding other parameters, occurs for any particular superconducting material at a point 45% of the distance between the zero point and point P. Point P′ of FIG. 1 designates the operating point for the particular superconducting generator and incorporating this 45% safety margin. This safety margin allowed the superconducting material to remain below the critical temperature during transients. Unfortunately, the cross-sectional area of the superconducting material necessary to handle the desired operating current is determined from this operating current density. Thus, if a large safety margin is necessary to ensure that the conductor does not go resistive, a larger cross-sectional area and therefore more expensive superconducting material is necessary. With the improved cooling capabilities of the new design herein described it is proposed that the winding can be worked at a higher percentage of its load line. For example, with a cryostabilized winding it is possible to operate a superconducting generator at operating conditions, and consequent conductor cross-sectional area, determined by a point P' located as high as 60 to 65% of the load line.

A superconducting generator constructed in accordance with the invention thus requires a lower safety margin because normalization of the conductors is not as critical.

In summary, the crucial nature and possible damaging results from a superconductor going resistive in previous designs necessitated a large safety margin be built into the computations of operating conditions. The safety margin dictated a larger cross-sectional area for the current carrying superconductors to ensure operating temperatures to be always below the critical temperature. Note that with prior designs this translated into approximately a 6 degree Kelvin temperature tolerance built into the superconducting operating conditions. Cryostability permits this temperature tolerance to be reduced; thus reducing the size and cost of the superconducting material.

An important operating condition, a temperature spike event, shall be considered next.

With a superconducting generator constructed in accordance with this invention, the superconductors can experience operating temperatures for short durations of time above the critical temperature, and then return to temperatures below that critical temperature. Empirically it has been determined that superconducting generators can experience transient events which result in a temperature spike event, that is, a sudden increase in temperature for a short duration of time, e.g., 1 millisecond to 20 seconds, and then a return to lower temperatures. Prior superconductive generators were designed around the assumption that if at any time a superconductor within the generator experiences a temperature greater than the critical temperature, the entire winding was in jeopardy of going resistive in such a manner as to possibly have dire consequences. For example, many have submitted the postulate that a runaway condition could result.

An example of such a transient event is a flux jump within the superconducting generator resulting from an avalanche movement of the lines of force to which the superconductors are subjected. This results in a heating of the superconductors subjected to the avalanche, in the order of 10 degrees Kelvin for a period of several milliseconds. Prior generators were designed to tolerate such heating without the superconductors exceeding the critical temperature. This was tolerated through the use of a larger safety margin in the conductor cross-sectional area design. With the improved cooling of the invention herein disclosed, the superconductors can be designed to operate normally at a temperature range closer to the critical temperature, and thus farther up the load line towards point P. A cryostabilized winding as disclosed herein can experience such a spike event, and its consequent heating, resulting in the superconductor exceeding the critical temperature for the length of time of the spike event, and then returning to normal operation below the critical temperature.

Another operating parameter which can take on a more favorable value due to the implementation of this invention is the design temperature. During operation of a superconducting rotor, the temperature of the helium bath is at some increment below the temperature of the adjacent superconductors. For example, the temperature of the helium bath may be 3.6° K. while the temperature of the adjacent superconductors may be approximately 4.2° K. In previous designs, the temperature corresponding to the P point, and thus affecting the current density and the consequent conductor cross-sectional area as discussed above, was believed to be the conductor temperature. A generator incorporating this invention can be designed around the helium bath temperature because of the increased cooling capabilities of flowing helium. This change in the design temperature results in the feasibility of utilizing less superconducting material for a given operating current. For example, 10 to 20% less superconducting material can be used when the design temperature is the helium bath temperature and not the conductor temperature.

As can be seen from the above discussion, savings can be realized in the amount of superconducting material used in a generator incorporating the invention, compared to previous generators of like ratings. The sources of these savings are: (1) the reduction permitted in the safety margin incorporated into the operating load line; (2) the flexibility gained in designing around the temperature of the flowing coolant, rather than that of the superconductors; and (3) the reduction in the corner radii of the individual superconductors.

This last source of savings, the reduction in the corner radii, is obtained from the reduced dependence on the helium storage sites used in previous designs. In fact, the corner radii are now not determined by the cooling needs of the winding. In the present invention, the corner radii can be drastically reduced. Note further that the area previously used for helium storage can now be used for a voltage standoff in the layer insulation, as discussed above.

OTHER DESIGN PARAMETERS

The cooling channels in all of the separators and insulation strips must not be so wide as to prevent lateral mixing of heated coolant. The flow of helium is due to density differences within the liquid. These density differences result from the temperature gradient experienced as the heat is transmitted by convection from the conductors to the coolant. The channels must be sufficiently narrow so as to be substantially isothermic within a short time after the conductors heat above the critical temperature. If the channels are too wide, turbulent restriction of the thermosyphon results. In other words, the vectors of the flow velocity of the fluid, the velocity introduced by density differences, is not directed downstream in the channel. Mathematically, the vectors corresponding to these velocities would not be substantially aligned and so therefore the heat would not be carried away from the overheated conductor's location. The interchange of helium is necessary since the quantity of helium within any of the chambers at any one time may be insufficient to cool such an overheated conductor.

Another design limitation is that the side insulation panels must have their radially extending channels tapered so that they are generally narrower nearer towards the rotor shaft. This has important temperature control implications. By designing these channels into a generally wedge shape, the channels can hold more coolant at greater radii relative to the rotor shaft. The hydrostatic pressure of the helium increases due to centrifugal force during the operation of the generator as the helium flows towards greater radii in the rotor. The maximum heat transfer occurs when the helium flows inward towards the center line, since as it flows, its temperature decreases due to local expansion or pressure reduction. This results in greater cooling capability due to the wedge-shaped channels. As a consequence of this, most of the helium at any one time is confined at greater radii in the channel. The helium flows therefore past the conductors towards the center line of the rotor, thereby taking advantage of its most efficient cooling capability.

It should now be understood that cryostability, as proposed herein, is not the product of any one change in the generator's structure, but rather is obtained through the combined and cumulative effects of the changes herein. Due to the achievement of cryostability, the operating parameters for the generator can be more economically favorable to the continued commercial application of superconduction.

I claim:

1. In a superconductive cylindrical rotor for a dynamoelectric machine said rotor, rotatable about an axis, having on its outer periphery a plurality of slots, each slot extending substantially along the length of the rotor, a slot assembly disposed within each of said slots, said assembly comprising:

- a plurality of slot walls which extend in a generally radial direction relative to said rotor axis;
- a plurality of conductor columns, each column having a plurality of superconductors, stacked one on top of another, in a generally radial direction relative to said rotor axis;
- each superconductor having a generally rectangular cross section, with bare surfaces generally parallel to said side walls, and other surfaces generally perpendicular to said parallel surfaces, said other surfaces having insulating material thereon;
- an insulative slot liner disposed about the slot assembly between the slot assembly and said slot walls;
- a plurality of insulative separators, one on each radial side of each conductor column, said separators having surfaces parallel to said side walls, said parallel surfaces having a plurality of coolant channels thereon;
- a plurality of side insulation panels, at least one of said side insulation panels being disposed on each side of the slot assembly and adjacent the slot liner, each of said side insulation panels having on at least one of its surfaces at least one coolant channel, said channel being tapered so as to be generally narrower nearer the rotor shaft;
- means for introducing coolant into said channels; and means for removing coolant from said channels.

2. The slot assembly of claim 1 further comprising a top strip radially outward of said conductor column and a bottom strip radially inward of said conductor columns, said top and bottom strip made of generally insulative material and having a plurality of surfaces perpendicular to said side walls, said surfaces having a plurality of coolant channels thereon which extend generally perpendicular to said side walls and which are in fluid communication by natural convection with said channels in said insulative separators and said side insulation panels.

3. The slot assembly of claim 2 wherein said introducing means is an inlet to said channels in said top strip and said removing means is an outlet from said channels in said bottom strip.

4. A superconductive rotor for a dynamoelectric machine comprising a rotor shaft, a support rim disposed about said shaft for rotation therewith, a plurality of slot teeth formed at the outer periphery of said support rim, said teeth located between and defining a plurality of rotor slots each comprising a bottom and two walls; and a plurality of slot assemblies one within each rotor slot, each slot assembly comprising:

- a plurality of conductor stacks, each stack having a plurality of superconductors, said superconductors within each stack disposed generally parallel to the rotor shaft and positioned one on top of another in a generally radial direction relative to the rotor shaft each of said superconductors comprising bare surfaces parallel to said walls;
- a plurality of insulating separators, each stack separated from an adjoining stack by at least one of said insulative separators; each insulative separator having on at least one of its surfaces a plurality of coolant channels wherein coolant can be circulated in thermal communication with at least one of said superconductors;
- a plurality of insulative strips; each superconductor within each stack separated from the next superconductor within the same stack by at least one of said insulative strips; and
- an insulative slot liner disposed about the slot assembly between the slot assembly and said slot walls;
- a plurality of side insulation panels, at least one side insulation panel on either side of the slot assembly, each side insulation panel having on at least one of its surfaces at least one coolant channel, said channel being tapered so as to be generally narrower nearer the rotor shaft.

5. The rotor of claim 4 wherein said slot assembly has at least one coolant channel on each side insulation panel and on each insulative separator, said coolant channel disposed generally parallel to said conductor stacks.

6. The rotor of claim 5 wherein said slot assembly further comprises a slot wedge; a top strip disposed between said slot wedge and said conductor stacks; and a bottom strip disposed between said rotor's support rim and said conductor stacks; said top strip and said bottom strip each having on at least one of its surfaces at least one coolant channel; said coolant channels on said top and bottom strips, said insulative separators and said side panels, aligned so as to permit coolant flow therethrough.

7. The rotor of claim 4 wherein the slot assembly further comprises a plurality of side insulation panels; at least one side insulation panel between said slot liner and the conductor stack nearest the slot liner; said side insulation panel having at least one coolant channel wherein coolant can be stored and can flow in thermal communication by natural convection with said conductor stack, said channel being tapered so as to be generally narrower nearer the rotor shaft.

8. The rotor of claim 6 wherein said rotor slot assembly further comprises an inlet means for introducing coolant into said channels and an outlet means for removing coolant from said channels; said inlet and outlet flows being by natural convection.

9. The rotor of claim 4 wherein said rotor slot assembly has channels in its side insulation panels which have smaller cross-sectional areas nearer the rotor shaft.

10. A dynamoelectric machine comprising a frame; a stator within said frame; and a superconductive rotor within said stator; said rotor having a center shaft disposed for rotation relative to said stator, a rotor rim about said shaft for rotation therewith, said rotor rim having about its periphery a plurality of slot teeth, each adjacent pair of slot teeth defining a rotor slot therebetween, a slot assembly disposed within each of said slots, said slot assembly comprising:

an array of superconductors, said array having a plurality of columns of superconductors, said columns extending in a generally radial direction relative to the rotor shaft, and a plurality of rows of superconductors, said rows extending in a generally circumferential direction relative to the rotor shaft, said superconductors having a generally rectangular cross-section with two of its surfaces covered with insulating material and two of it sides bare, each of said insulated surfaces of each superconductor extending parallel to said rows of said array and each of said bare sides extending perpendicular to said rows of said array; each of said columns of said superconductors being separated from adjacent columns within said array by an insulative separator having surfaces parallel to said columns; a plurality of cooling channels disposed on said surfaces, said cooling channels extending in a generally radial direction relative to the rotor shaft, said cooling channels being capable of acting as conduits for a flowing liquid coolant, said liquid coolant in said channels being in thermal communication with said columns of superconductors;

a slot wedge;

a top strip disposed between said slot wedge and a row of said array radially farthest from the center shaft;

a bottom strip disposed between said rotor rim and a row of said array radially the closest to the rotor shaft, said top and bottom strips having surfaces parallel to said array's rows, said parallel surfaces having a plurality of circumferentially extending channels and at least one channel parallel to said center shaft; and a side insulation panel between the tooth defining the rotor slot and its nearest column of superconductors, said side insulation panel having a plurality of surfaces parallel to said column, said surfaces having a plurality of radial extending coolant channels, said channels being tapered so as to be generally narrower nearer the rotor shaft;

whereby said coolant channels within the separators, said top and bottom strips, and said side insulation panels are aligned so as to establish at least one coolant path along which coolant may circulate within the slot assembly by natural convection.

11. The dynamoelectric machine of claim 10 wherein the slot wedge has a bore therethrough which acts to fluidly connect a liquid supply system to said aligned channels whereby coolant is introduced into the slot assembly; and the rotor has a bore therethrough to fluidly connect the aligned channels with a fluid removal system.

12. The dynamoelectric machine of claim 10 wherein the superconductors are oriented within the rotor slot assembly so as to have their wider sides parallel to the matrix columns.

13. The dynamoelectric machine of claim 12 wherein the wider sides have channels running in a generally radial direction and which are adjacent corresponding channels in the most proximate insulative separator to said wider said channels, whereby the conductor surface area in direct thermal communication with the fluid channels is increased.

* * * * *